US012277898B2

(12) United States Patent
Lin et al.

(10) Patent No.: US 12,277,898 B2
(45) Date of Patent: Apr. 15, 2025

(54) LUMINANCE COMPENSATION METHOD AND DISPLAY SYSTEM

(71) Applicant: AUO Corporation, Hsin-Chu (TW)

(72) Inventors: Shin-Ru Lin, Hsin-Chu (TW); Yi-Fu Ou, Hsin-Chu (TW)

(73) Assignee: AUO CORPORATION, Hsin-Chu (TW)

( * ) Notice: Subject to any disclaimer, the term of this patent is extended or adjusted under 35 U.S.C. 154(b) by 0 days.

(21) Appl. No.: 18/463,490

(22) Filed: Sep. 8, 2023

(65) Prior Publication Data

US 2024/0321181 A1 Sep. 26, 2024

(30) Foreign Application Priority Data

Mar. 23, 2023 (TW) ................................ 112110987

(51) Int. Cl.
*G09G 3/32* (2016.01)

(52) U.S. Cl.
CPC ....... *G09G 3/32* (2013.01); *G09G 2320/0233* (2013.01); *G09G 2320/0276* (2013.01); *G09G 2320/0673* (2013.01); *G09G 2320/0693* (2013.01); *G09G 2360/16* (2013.01)

(58) Field of Classification Search
CPC ............ G09G 3/32; G09G 2320/0233; G09G 2320/0276; G09G 2320/0673; G09G 2320/0693; G09G 2360/16
See application file for complete search history.

(56) References Cited

U.S. PATENT DOCUMENTS

| | | | | |
|---|---|---|---|---|
| 6,630,801 | B2 | 10/2003 | Schuurmans | |
| 7,067,995 | B2 | 6/2006 | Gunter | |
| 7,208,713 | B2 | 4/2007 | Ishiguchi | |
| 7,671,542 | B2 | 3/2010 | Chang | |
| 10,909,948 | B2 * | 2/2021 | Chen | G09G 5/02 |
| 11,217,142 | B1 * | 1/2022 | Buckley | G06T 5/10 |
| 11,626,057 | B1 * | 4/2023 | Park | G09G 3/2003 345/690 |
| 2006/0220055 | A1 | 10/2006 | Erchak | |
| 2007/0285378 | A1 | 12/2007 | Lankhorst | |
| 2012/0098851 | A1 * | 4/2012 | Yamaguchi | G03B 21/14 345/589 |
| 2012/0212520 | A1 * | 8/2012 | Matsui | G09G 3/3611 345/101 |
| 2012/0281008 | A1 * | 11/2012 | Marcu | G09G 3/006 345/589 |
| 2013/0106924 | A1 | 5/2013 | Matsui et al. | |
| 2014/0139570 | A1 * | 5/2014 | Albrecht | G09G 5/06 345/694 |

(Continued)

FOREIGN PATENT DOCUMENTS

| | | | |
|---|---|---|---|
| CN | 102549649 | A | 7/2012 |
| CN | 115662329 | A | 1/2023 |

*Primary Examiner* — Ibrahim A Khan
(74) *Attorney, Agent, or Firm* — WPAT, PC

(57) ABSTRACT

A luminance compensation method includes the following steps. Temperature data of a display is received. A gamma correction table is obtained. Multiple gamma adjustment points are generated according to the temperature data and the gamma correction table. A gamma correction curve is generated according to the gamma adjustment points. The display displays an image according to the gamma correction curve.

10 Claims, 17 Drawing Sheets

(56) References Cited

U.S. PATENT DOCUMENTS

| | | | | |
|---|---|---|---|---|
| 2014/0139571 | A1* | 5/2014 | Albrecht | G09G 5/02 345/694 |
| 2015/0116379 | A1* | 4/2015 | Lim | G09G 3/342 345/691 |
| 2016/0012763 | A1* | 1/2016 | Chen | G09G 3/3696 345/89 |
| 2018/0033696 | A1* | 2/2018 | Nakagawa | G11C 8/10 |
| 2019/0088199 | A1* | 3/2019 | Zhang | G09G 3/3233 |
| 2019/0088205 | A1* | 3/2019 | Zhang | G09G 3/3233 |
| 2021/0241678 | A1* | 8/2021 | Asamura | G09G 3/32 |
| 2021/0350763 | A1* | 11/2021 | Okamura | G06F 3/0412 |
| 2021/0407411 | A1* | 12/2021 | Yang | G09G 3/3233 |
| 2023/0030225 | A1* | 2/2023 | Lee | G09G 3/3426 |
| 2023/0230541 | A1* | 7/2023 | Kim | G09G 3/3208 345/698 |

* cited by examiner

LUMINANCE COMPENSATION METHOD AND DISPLAY SYSTEM

RELATED APPLICATIONS

This application claims priority to Taiwan Application Serial Number 112110987, filed Mar. 23, 2023, which is herein incorporated by reference in its entirety.

BACKGROUND

Field of Invention

The disclosure relates to a luminance compensation method and a display system. More particularly, the disclosure relates to a luminance compensation method and display system capable for performing calibration on the display according to operating temperature.

Description of Related Art

In nowadays techniques of display panel, sizes of light emitting elements are rapidly decreased, which can achieve many advantages, such as, higher resolution, wider color gamut, lower power consumption, and larger range in operation temperature. However, the smaller the light emitting elements are provided, the larger the luminance drops with temperature. Therefore, how to provide a luminance compensation method capable for performing compensation on the brightness of the display panel which would drop with temperature is an important issue in this field.

SUMMARY

An embodiment of the disclosure provides a luminance compensation method. The luminance compensation method includes the following steps. Temperature data of a display panel is received. A gamma correction table is obtained. A plurality of gamma adjustment points are generated according to the temperature data and the gamma correction table. A gamma correction curve is generated according to the gamma adjustment points. An image is displayed by the display panel, according to the gamma correction curve.

Another embodiment of the disclosure provides a display system. The display system includes a display panel, a temperature sensor and a processing circuit. The temperature sensor is configured to generate temperature data of the display panel. The processing circuit is electrically coupled to the display panel and the temperature sensor. The processing circuit is configured to perform the following steps. A plurality of gamma adjustment points are generate according to the temperature data and a gamma correction table. A gamma correction curve is generated according to the gamma adjustment points. A gamma correction curve is generated according to the gamma adjustment points. An image is displayed by the display panel according to the gamma correction curve.

The other embodiment of the disclosure provides a luminance compensation method. The luminance compensation method includes the following steps. Temperature data of a display panel is received. The temperature data is mapped to a plurality of adjusted time intervals of a plurality of sub-pixels. A plurality of emission periods of the sub-pixels of the display panel are calculated according to the adjusted time intervals, respectively, to generate a plurality of corrected emission periods. An image is displayed, by the display panel, according to the corrected emission periods of the sub-pixels.

BRIEF DESCRIPTION OF THE DRAWINGS

The disclosure can be more fully understood by reading the following detailed description of the embodiment, with reference made to the accompanying drawings as follows.

DETAILED DESCRIPTION

Figure 1:
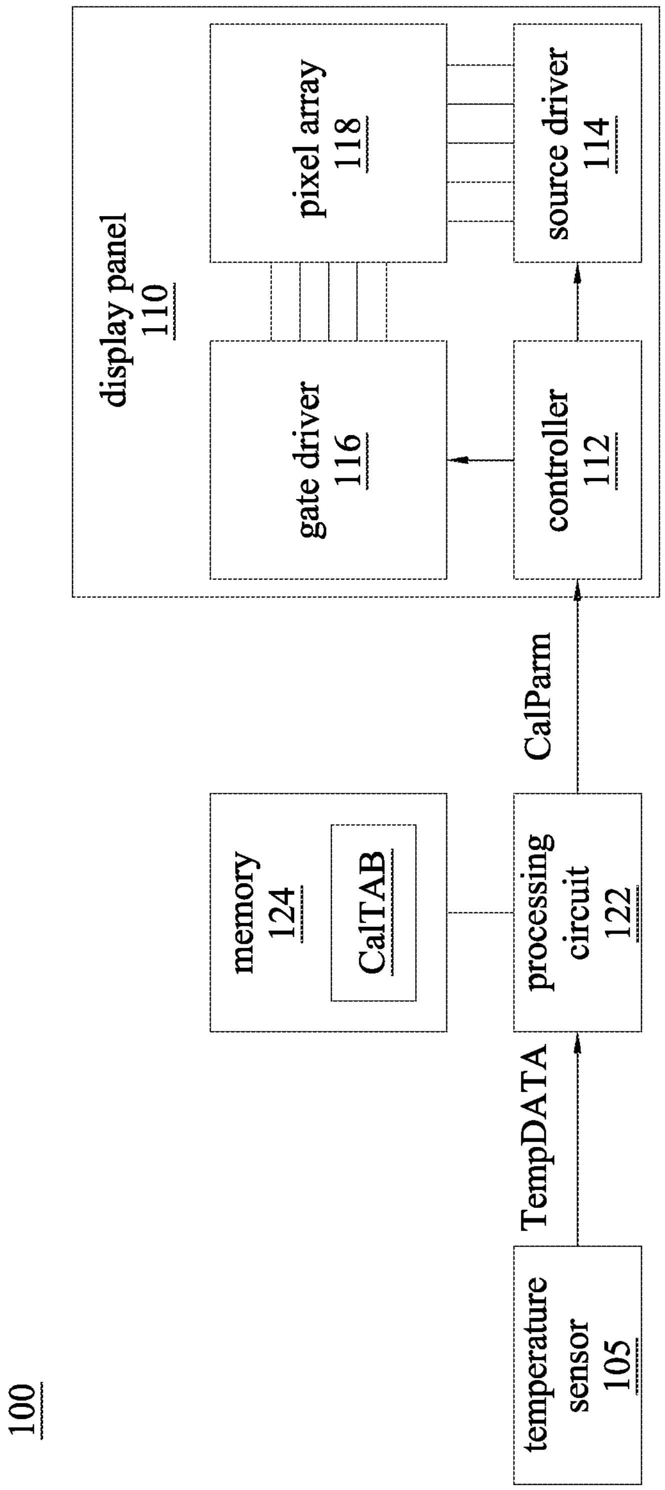
FIG. 1 is a schematic diagram illustrating a display system according to some embodiments of the present disclosure.

Reference is now made in detail to the present embodiments of the disclosure, examples of which are illustrated in the accompanying drawings. The embodiments below are described in detail with the accompanying drawings, but the examples provided are not intended to limit the scope of the disclosure covered by the description. The structure and operation are not intended to limit the execution order. Any structure regrouped by elements, which has an equal effect, is covered by the scope of the present disclosure. Wherever possible, the same reference numbers are used in the drawings and the description to refer to the same or like parts.

In the description herein and throughout the claims that follow, the terms "comprise" or "comprising," "include" or "including," "have" or "having," "contain" or "containing" and the like used herein are to be understood to be open-ended, i.e., to mean including but not limited to. In the description herein and throughout the claims that follow, the phrase "and/or" includes any and all combinations of one or more of the associated listed claims.

Reference is made to FIG. 1. FIG. 1 is a schematic diagram illustrating a display system 100 according to some embodiments of the present disclosure. As shown in FIG. 1, the display system 100 includes a temperature sensor 105, a processing circuit 122, a memory 124 and a display panel 110. In some embodiments, the display system 100 can be implemented by an electronic device with a display panel, such as, laptop, mobile, desktop or other electronic device. In other embodiments, the display system 100 can be implemented by a display device, which is not intended to limit the present disclosure.

In some embodiments, the temperature sensor 105 can be implemented by a contact temperature sensor, and a sensing section of the temperature sensor 105 can be disposed in a position which is adjacent to the display panel 110, such as, a top side, bottom sides, outer edge of the display panel 110, in order to detect a temperature of the display panel 110 and to generate temperature data Temp DATA of the display panel 110. In other embodiments, the temperature sensor 105 can be implemented by a non-contact temperature sensor, which is not intended to limit the present disclosure.

In some embodiments, the memory 124 stores a calibration table CalTAB for calibrating a gamma curve and/or emission period of the display panel 110 according to temperature variation of the display panel 110. In some embodiments, before the product leaves the factory, an optical detection system (not shown in FIG. 1) performs gamma calibration on the display panel 110, to obtain the said calibration table CalTAB, and the calibration table CalTAB can be wrote in the memory 124 by one time programming.

In some embodiments, the processing circuit 122 can be implemented by circuit or components of system side, e.g. circuit/component in motherboard of a laptop, mobile device, desktop or other electronic device. In some embodiments, the processing circuit 122 is electrically coupled to the memory 124, to obtain the calibration table CalTAB from the memory 124. In some embodiments, the processing circuit 122 receives the temperature data TempDATA of the display panel 110 from the temperature sensor 105, and the processing circuit 122 obtains the calibration table CalTAB from the memory 124, so as to output the calibration parameters CalParm according to the temperature data TempDATA of the display panel 110 and the calibration table CalTAB.

In some embodiments, the display panel 110 receives the calibration parameters CalParm from the processing circuit 122, and calibrates display brightness according to the calibration parameters CalParm. In some embodiments, the display panel 110 includes a controller 112, a source driver 114, a gate driver 116 and a pixel array 118. In some embodiments, the pixel array 118 can be implemented by light emitting diode pixel array. In some embodiments, the pixel array 118 can be implemented by micro-light emitting diode pixel array. In some embodiments, the pixel array 118 can be implemented by mini-light emitting diode pixel array or pixel array including light emitting diode with other size, which is not intended to limit the present disclosure.

Figure 2:
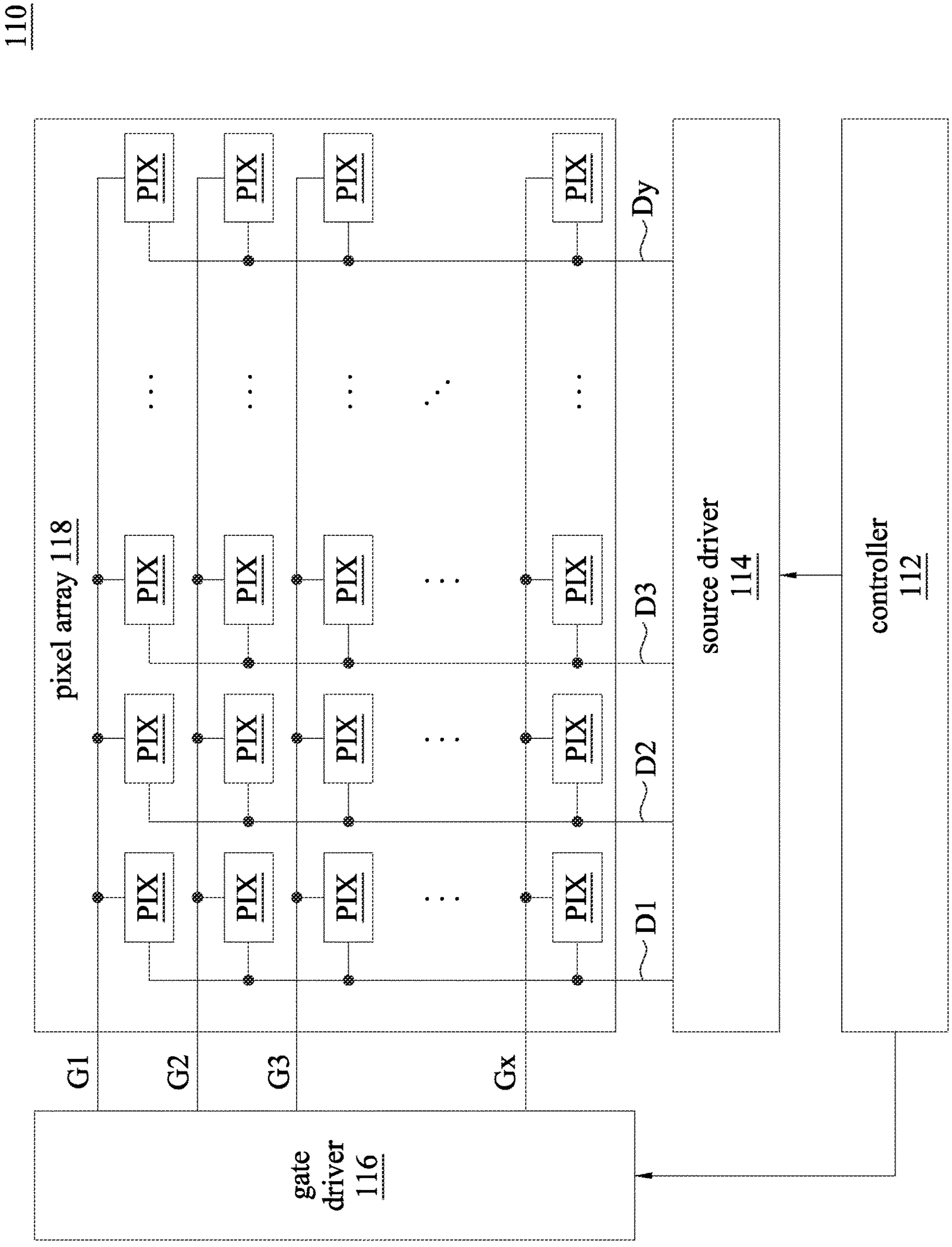
FIG. 2 is a schematic diagram illustrating a display panel according to some embodiments of the present disclosure.

Reference is made to FIG. 1 and FIG. 2. FIG. 2 is a schematic diagram illustrating a display panel 110 according to some embodiments of the present disclosure. As shown in FIG. 2, the pixel array 118 includes multiple pixel circuits PIX, and each of the pixel circuits PIX includes a light emitting element. In some embodiments, the said light emitting element can be implemented by micro-light emitting element, and the pixel array 118 can be considered as a micro-light emitting diode pixel array. In some embodiments, the display panel 110 is a micro-LED display. In other embodiments, the said light emitting element can be implemented by light emitting element with other size. In some embodiments, the gate driver 116 is electrically coupled to the pixel circuits PIX arranged in the same pixel row through each of the gate lines G1~Gx, so as to perform progressive scanning. In some embodiments, the source driver 114 is electrically coupled to the pixel circuits PIX arranged in the same pixel column through each of the data lines D1~Dy, so as to transmit data voltages to the corresponding pixel circuit PIX, and to setup the brightness of the light emitting element included in each of the pixel circuits PIX.

Figure 3A:
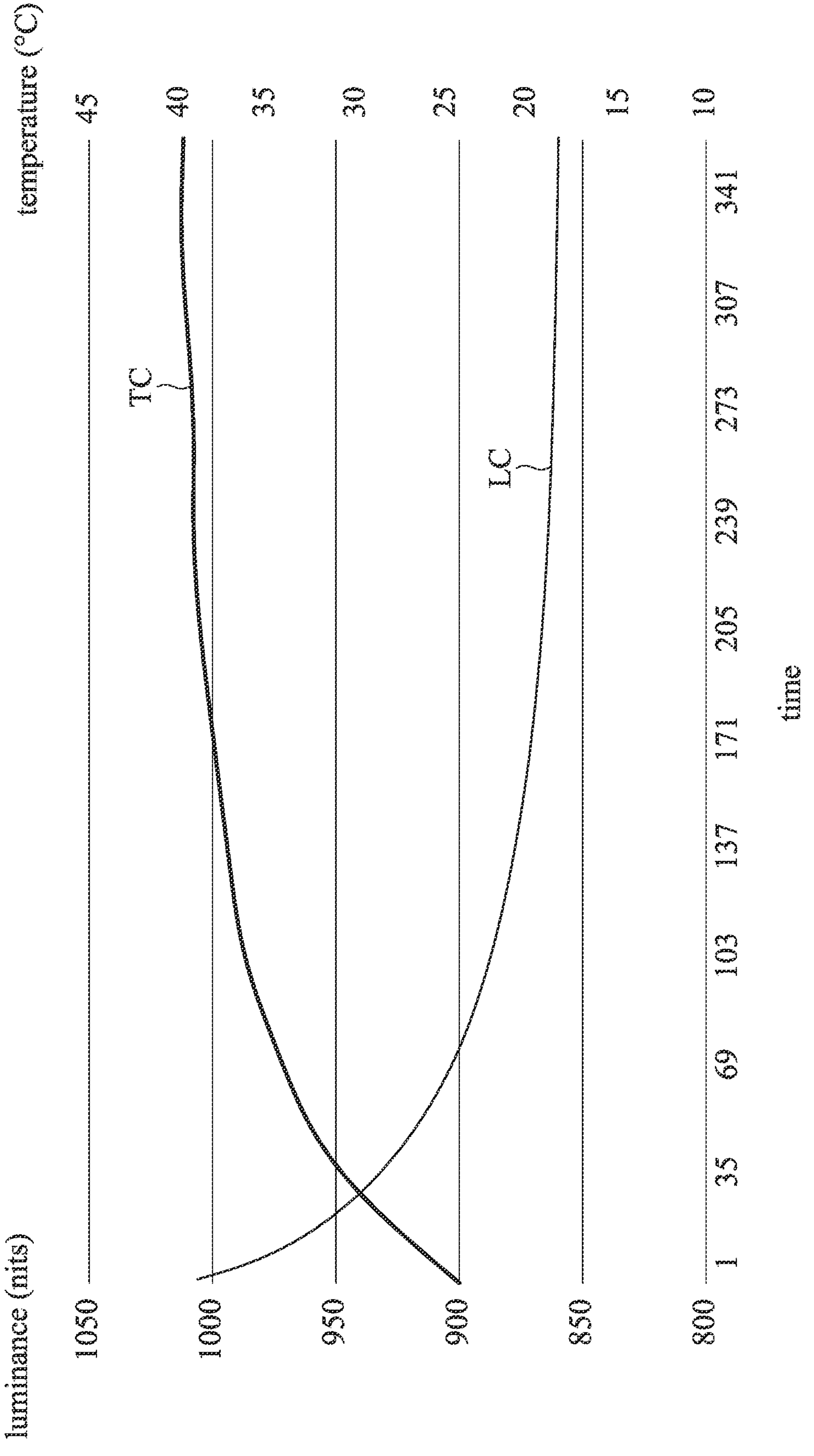
FIG. 3A is a schematic diagram illustrating luminance and temperature variated with time according to some embodiments of the present disclosure.

Reference us made to FIGS. 1 to 3A. FIG. 3A is a schematic diagram illustrating luminance LC and temperature TC variated with time according to some embodiments of the present disclosure. In some embodiments, compare to the liquid crystal panel and the organic light emitting diode panel, the micro-light emitting diode panel can operate in a larger temperature range. Wherein, the variation of the temperature has greater impact on the smaller light emitting element, as shown in FIG. 3A. When the temperature TC of the micro-light emitting diode panel is increased with working times, the luminance LC thereof drops in certain values. And, since luminance drop ratios of the red, blue and green light emitting elements variated with the temperature are different to each other, it causes color shift.

For example, the luminance values of red, blue and green light emitting elements at the initial operation stage are respectively 100 nits, 210 nits and 74 nits. When the display panel still working and the temperature is increased, the luminance values of red, blue and green light emitting elements under the condition of the same data setting respectively drop to 70 nits, 200 nits and 70 nits, the luminance drop ratios of the red, blue and green light emitting elements are different to each other, causing that the color shift occurs on a pixel and/or an entire display image.

Figure 3B:
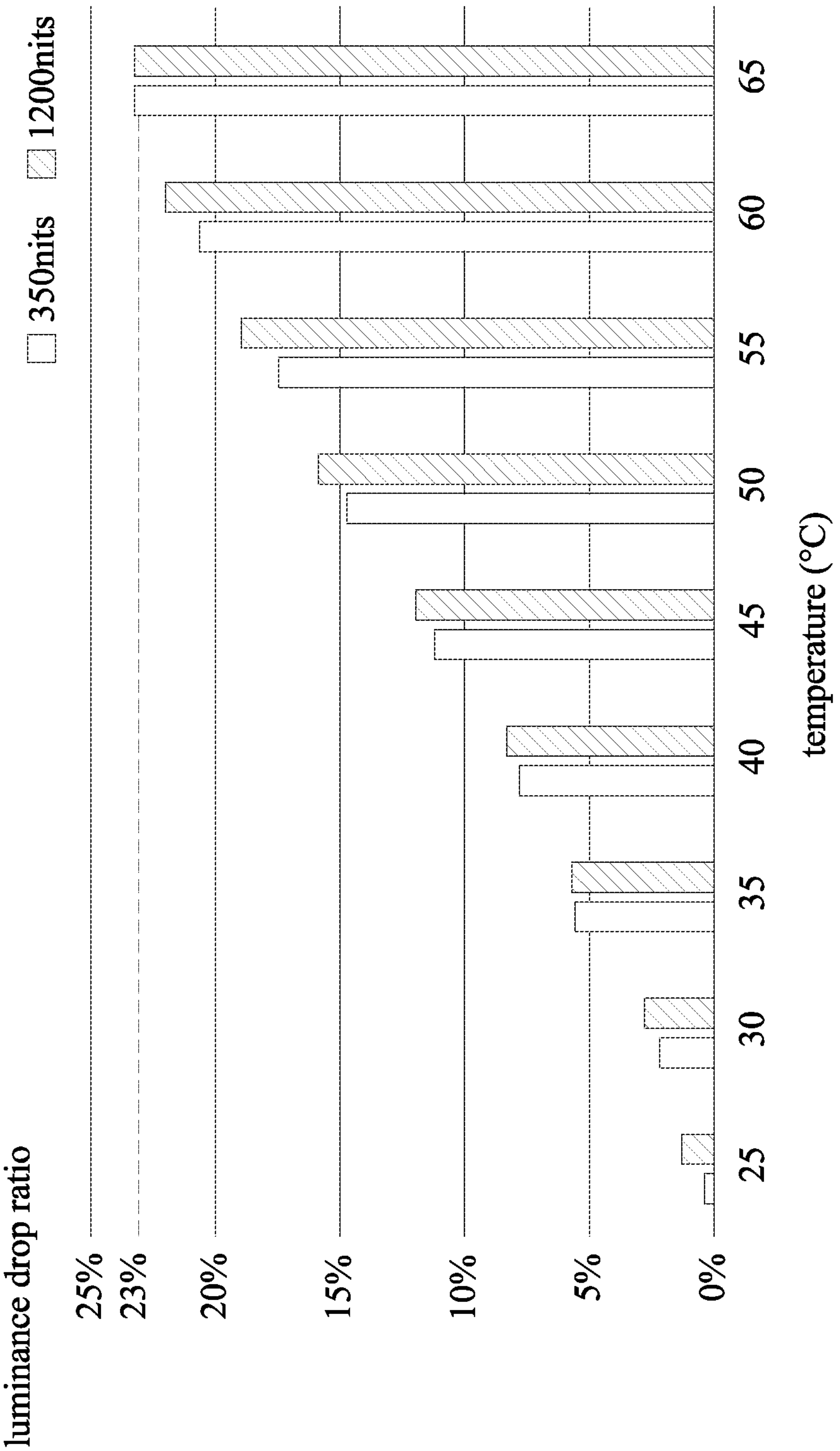
FIG. 3B is a schematic diagram illustrating luminance drop ratio at different temperatures according to some embodiments of the present disclosure.
Figure 4A:
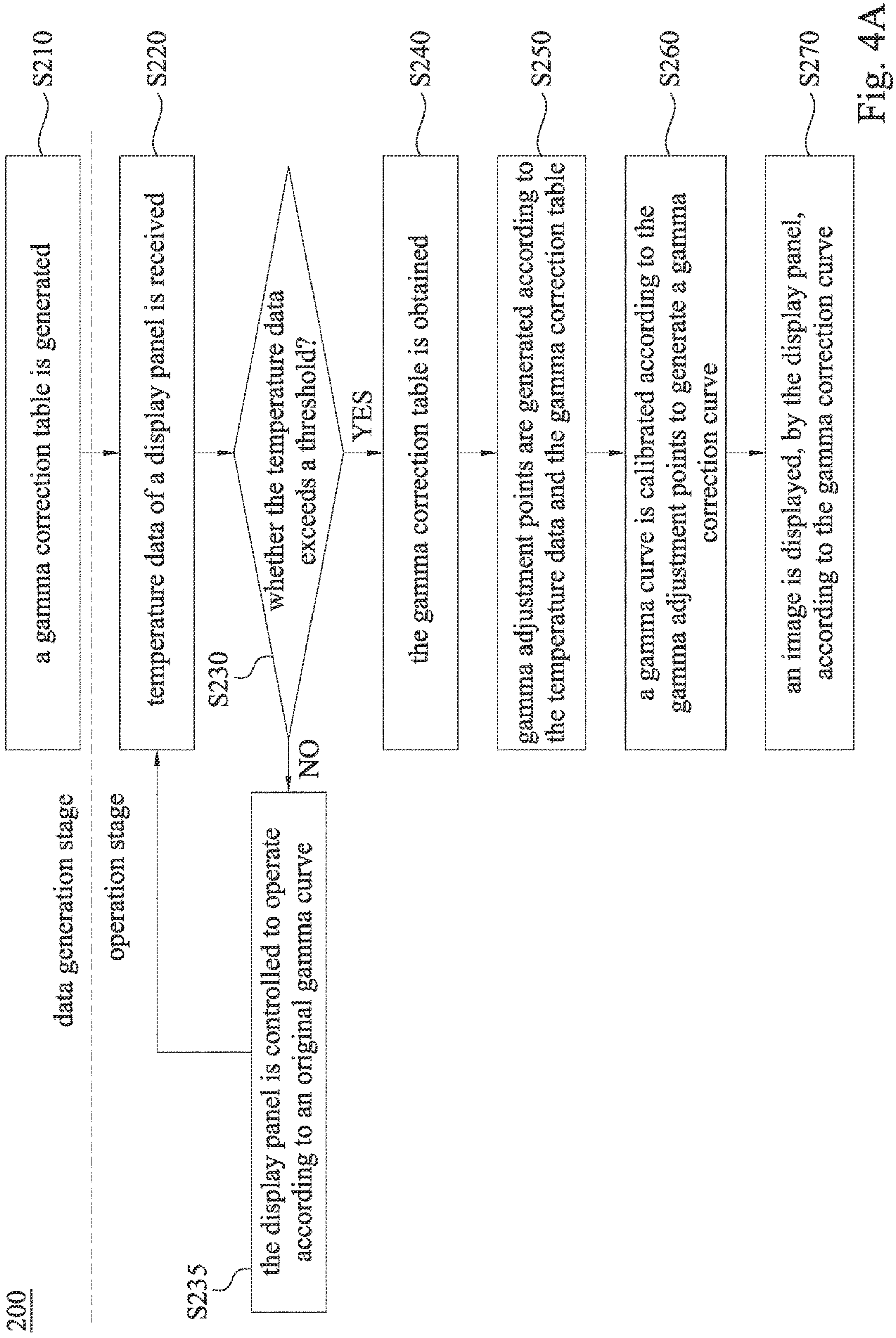
FIG. 4A is a flowchart illustrating a luminance compensation method according to some embodiments of the present disclosure.

Reference is made to FIG. 3B. FIG. 3B is a schematic diagram illustrating luminance drop ratio at different temperatures according to some embodiments of the present disclosure. As shown in FIG. 3B, when the temperature of the display panel is increased, luminance drop ratios of the display panel in the high brightness mode (such as, 1200 nits) and in the normal mode (such as, 350 nits) are progressively increased, and the drop ratios thereof are similar at the same temperature, it can derive that a trend of luminance drop of the display panel is strong related with the temperature from FIG. 3B. Therefore, a luminance compensation method is provided in the present disclosure. Reference is made to FIG. 1 and FIG. 4A. FIG. 4A is a flowchart illustrating a luminance compensation method 200 according to some embodiments of the present disclosure.

As shown in FIG. 4A, the luminance compensation method 200 includes steps S210~S270. Wherein, steps S210~S270 can be classified into step S210 which can be performed at a data generation stage and steps S220~S270 which can be performed at an operation stage. In some embodiments, step S210 can be performed before the product leaves the factory, and steps S220~S270 can be performed during the product being used. In some embodiments, steps S220~S250 of the luminance compensation method 200 is performed by the processing circuit 122, and steps S260~270 can be performed by the display panel 110. The luminance compensation method 200 of the display panel 110 includes step S210 at the data generation stage. In step S210, a gamma correction table is generated.

Figure 4B:
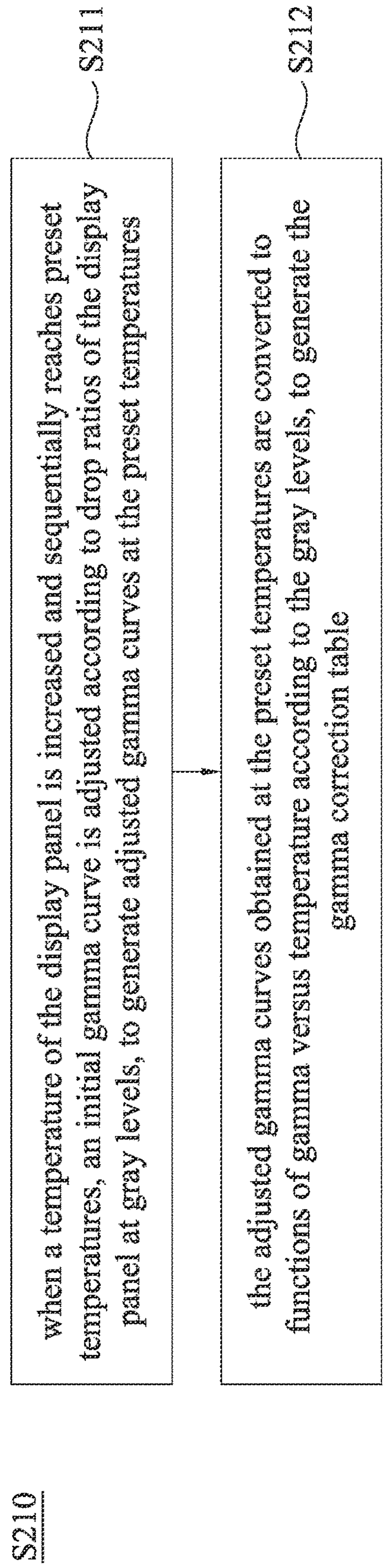
FIG. 4B is a flowchart illustrating a step S210 of luminance compensation method in FIG. 4A according to some embodiments of the present disclosure.
Figure 4C:
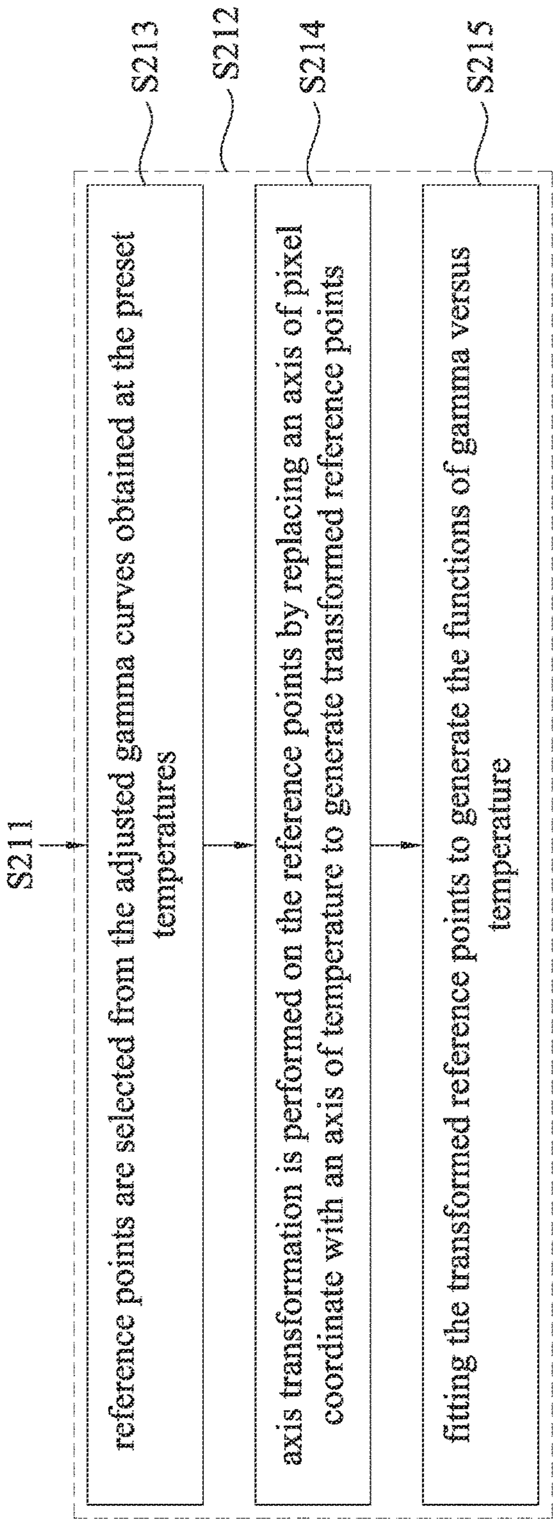
FIG. 4C is a flowchart illustrating a step S212 of luminance compensation method in FIG. 4A according to some embodiments of the present disclosure.
Figure 5B:
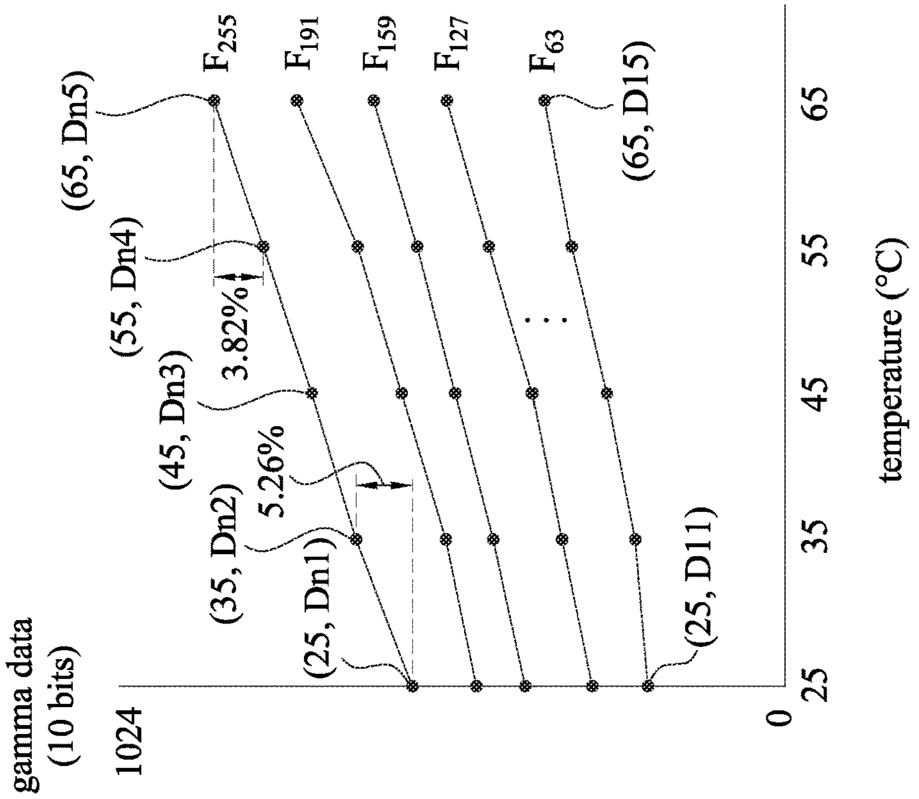
FIG. 5B is a schematic diagram illustrating curves of gamma versus temperature according to some embodiments of the present disclosure.
Figure 5A:
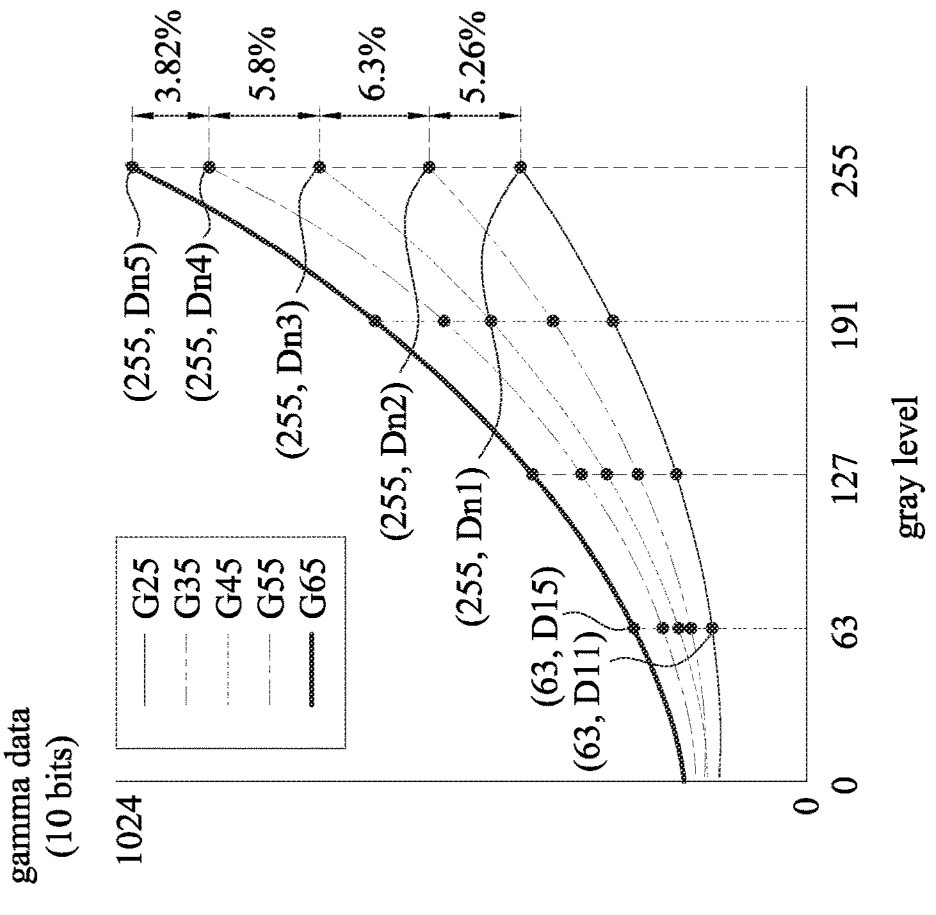
FIG. 5A is a schematic diagram illustrating adjusted gamma curves according to some embodiments of the present disclosure.

For better understanding how to generate the gamma calibration table, reference is also made to FIG. 1, FIG. 4A, FIG. 4B, FIG. 5A and FIG. 5B. FIG. 4B is a flowchart illustrating a step S210 of luminance compensation method 200 in FIG. 4A according to some embodiments of the present disclosure. FIG. 4C is a flowchart illustrating a step S212 of luminance compensation method 200 in FIG. 4A according to some embodiments of the present disclosure. FIG. 5A is a schematic diagram illustrating adjusted gamma curves according to some embodiments of the present disclosure. FIG. 5B is a schematic diagram illustrating curves of gamma versus temperature according to some embodiments of the present disclosure. As shown in FIG. 4B, step S210 includes steps S211 and S212.

The luminance compensation method 200 is capable for a display panel 110 with pulse amplitude modulation techniques. The luminance compensation method 200 includes steps S211~S215 at a data generation stage.

In step S211, when a temperature of the display panel 110 is increased and sequentially reaches preset temperatures, an initial gamma curve is adjusted according to drop ratios of the display panel 110 at the multiple gray levels, to generate adjusted gamma curves G25~G65 at the preset temperatures.

For example, if a temperature of the display panel 110 is 25° C., luminance values of the display panel 110 at different input gray-levels are recorded, and an initial gamma curve is adjusted according to drop ratios of the aforesaid luminance values to adjust the display panel 110 to a preset luminance, so as to obtain a adjusted gamma curve G25. As a result, when the temperature of the display panel 110 is progressively increased and reaches another preset temperature, such as, 35° C., 45° C., 55° C. and 65° C., the adjusted gamma curves G35~G65 at the preset temperatures can be obtained, as shown in FIG. 5A. In some embodiments, the gamma parameters can be adjusted at other temperatures to obtain different number of adjusted gamma curves, which is not intend to limit the present disclosure.

In step S212, the adjusted gamma curves G25~G65 obtained at the preset temperatures are converted to functions of gamma versus temperature C63~C255 according to the gray levels, to generate the gamma correction table. Step S212 includes steps S213 to S215, as shown in FIG. 4C.

In step S213, reference points are selected from the adjusted gamma curves G25~G65 obtained at the preset temperatures. For example, gamma data at gray-level of 255 is selected from the adjusted gamma curves G25~G65 to generate reference points (255, Dn1)~(255, Dn5), and so on. Correspondingly, gamma data at the other gray-levels is selected to generated reference points (63, D11)~(63, D15).

In step S214, axis transformation is performed on the reference points by replacing an axis of pixel coordinate with an axis of temperature to generate transformed reference points. For example, since the adjusted gamma curves G25~G65 are respectively obtained at temperatures 25° C.~65° C., gray-levels of reference points (255, Dn1)~(255, Dn5) selected from the adjusted gamma curves G25~G65 are transformed to the temperature values, in order to obtain transformed reference points (25, Dn1), (35, Dn2), (45, Dn3)~(65 Dn5), and so on. Correspondingly, gray-levels of reference points (63, D11)~(63, D15) selected from the adjusted gamma curves G25~G65 are transformed to the temperature values, in order to obtain transformed reference points (25, D11)~(65, D15).

In step S215, fitting the transformed reference points to generate the functions of gamma versus temperature. For example, curve fitting is performed on the transformed reference points (25, Dn1)~(65, Dn5) to generate a function of gamma versus temperature $F_{255}$ which refers to gamma data at gray-level of 255 variated with temperatures. Similarity, curve fitting is performed on the transformed reference points (25, D11)~(65, D15) to generate a function of gamma versus temperature $F_{63}$ which refers to gamma data at gray-level of 63 variated with temperatures.

As a result, the functions of gamma versus temperature $F_{63}$, $F_{127}$, $F_{159}$~$F_{255}$ which refer to gamma data at gray-levels of 63, 127, 159~255 variated with the temperatures can be obtained. In some embodiments, the number of the functions of gamma versus temperature $F_{63}$~$F_{255}$ can be implemented by 13. In other embodiments, the gamma correction table includes more or less functions of gamma versus temperature.

In some embodiments, the aforesaid curve fitting can be implemented by a fitting for linear equation, quadratic equation or polynomial equation, so as to obtained the corresponding functions of gamma versus temperature $F_{63}$~$F_{255}$, in order to better fit the transformed reference points. In some embodiments, parameters for each items in the functions of gamma versus temperature $F_{63}$, $F_{127}$, $F_{159}$~$F_{255}$ can be stored in the corresponding columns in the gamma correction table, and the expression of the functions can be simplified. In some embodiments, the functions of gamma versus temperature $F_{63}$~$F_{255}$ can be obtained by a fitting of cubic equation, and wherein the gamma correction table can be expressed by Table 1, as shown in the following.

TABLE 1

| | $x^3$ | $x^2$ | x | C |
|---|---|---|---|---|
| $F_{255}(x)$ | −2.25 | 23.75 | −36 | 657.4 |
| $F_{191}(x)$ | −1.3333 | 20.571 | −29.095 | 793 |
| . . . | . . . | . . . | . . . | . . . |
| $F_{63}(x)$ | 0 | 0 | 53.8 | 710.6 |

For example, the function of gamma versus temperature $F_{255}$ which refer to gamma data at gray-level of 255 variated with temperatures can be considered as $F_{255}(x)=-2.25x^3+23.75x^2-36x+657.4$, as shown in Table 1. As a result, the establishment for gamma correction table can be completed. In some embodiments, parameters of the aforesaid adjusted gamma curves G25~G65 and the functions of gamma versus temperature $F_{63}$~$F_{255}$ included in the gamma correction table can be wrote into the memory 124 by one-time programming.

To be noted that, the aforesaid gamma correction table is a single color gamma correction table, such as, one of the red, blue and green gamma correction tables. Therefore, steps S211~215 can be repeated to obtained all of the red, blue and green gamma correction tables, in or der to respectively perform luminance compensation on the red, blue and green light emitting diodes with different luminance drop ratios at a temperature at the moment.

The luminance compensation method 200 is capable for a display panel 110 with pulse amplitude modulation techniques. The luminance compensation method 200 includes steps S220~S270 at an operation stage.

In step S220, temperature data TempDATA of a display panel 110 is received. The processing circuit 122 receives the current temperature data TempDATA of the display panel 110 from the temperature sensor 105.

In step S230, whether the temperature data exceeds a threshold? In some embodiments, the processing circuit 122 determines whether the temperature data exceeds a threshold. In some embodiments, the aforesaid threshold can be 25° C., 30° C., 35° C. or other appropriate temperature, which is not intended to limit the present disclosure. If the temperature data TempDATA is lower than the threshold, step S235 is then performed, the display panel 110 is controlled to operate according to an original gamma curve. The original gamma curve can be, such as, the adjusted gamma curve G25 obtained at temperature 25° C. If the temperature data TempDATA is higher than the threshold, step S240 is performed, the gamma correction table is obtained.

Figure 6A:
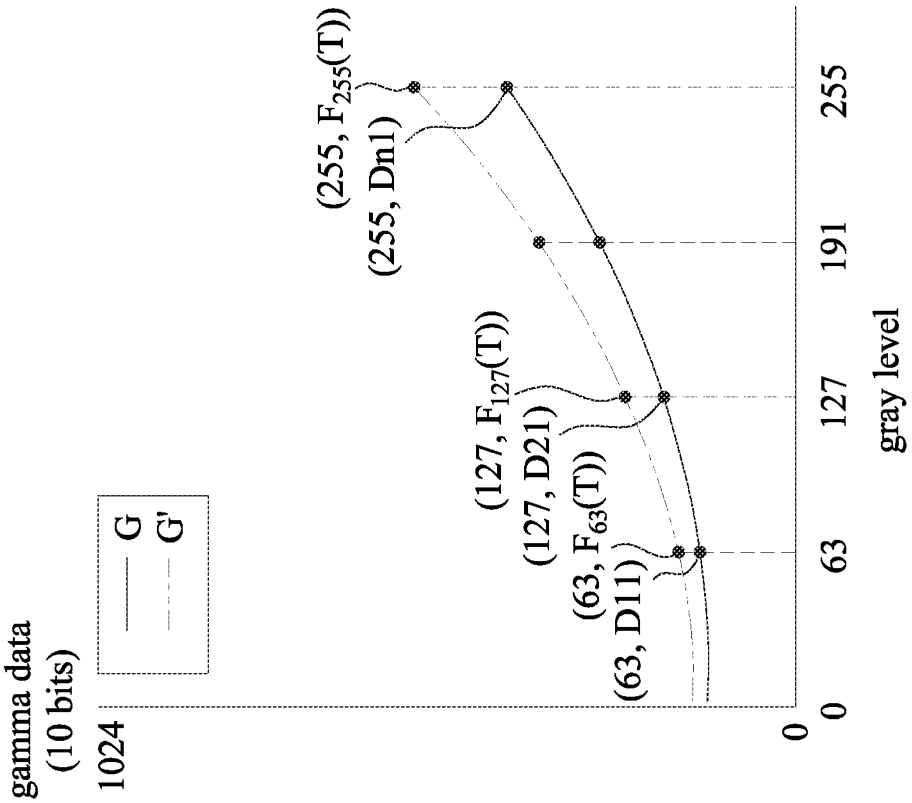
FIG. 6A is a schematic diagram illustrating a gamma curve and a gamma correction curve according to some embodiments of the present disclosure.

In step S250, gamma adjustment points are generated according to the temperature data TempDATA and the gamma correction table. Reference is made to FIG. 1, FIG. 4A and FIG. 6A. FIG. 6A is a schematic diagram illustrating a gamma curve G and a gamma correction curve G' according to some embodiments of the present disclosure. Specifically, the temperature data TempDATA is substituted into the functions of gamma versus temperature $F_{63}$~$F_{255}$ included in the gamma correction table, in order to generate the gamma adjustment points for the correspondingly gray-levels.

For example, the temperature data TempDATA detected from the display panel 110 is T° C., and wherein the said T refers to any constant value, the processing circuit 122 substitutes the temperature data TempDATA of T° C. for x in the functions of gamma versus temperature $F_{63}(x)$~$F_{255}(x)$ referring to gamma data at gray-levels of 63~255 variated with temperatures, in order to obtain the corrected gamma data $F_{63}(T)$~$F_{255}(T)$ at gray-levels of 63~255, and to generate gamma adjustment points (63, $F_{63}(T)$)~(255, $F_{255}(T)$). In some embodiments, the number of the gamma adjustment points can be implemented by 13 or other number that meet the specification of the display panel 110. In some embodiments, the processing circuit 122 outputs the gamma adjustment points to the display panel 110. In some embodiments, the gamma adjustment points generated according to the current temperature data TempDATA corresponding to the calibration parameter CalParm as shown in FIG. 1.

In step S260, a gamma curve is calibrated according to the gamma adjustment points (63, $F_{63}(T)$)~(255, $F_{255}(T)$) to generate a gamma correction curve. In some embodiments, the display panel 110 calibrates a current gamma curve G with the gamma adjustment points (63, $F_{63}(T)$)~(255, $F_{255}(T)$) to generate the gamma correction curve G', as shown in FIG. 6A. In other embodiments, the display panel 110 extends values of the gamma adjustment points (63, $F_{63}(T)$)~(255, $F_{255}(T)$) by interpolation to generate the gamma correction curve G'.

In step S270, an image is displayed, by the display panel 110, according to the gamma correction curve G'. For example, the display panel 110 converts an input image data to the data voltage according to the gamma correction curve G', such that each pixels included in the pixel array 118 can emits light according to corresponding data voltages.

Figure 6B:
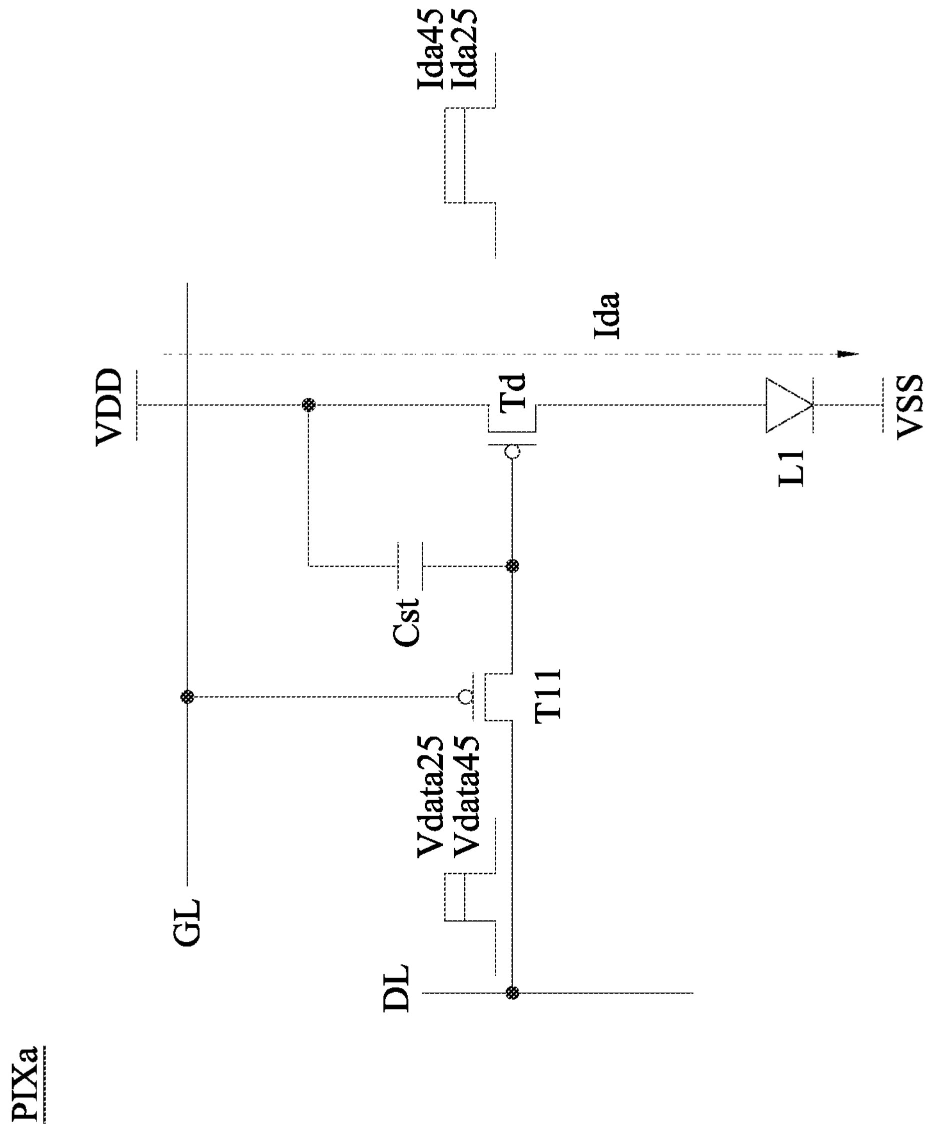
FIG. 6B is a schematic diagram illustrating a pixel circuit according to some embodiments of the present disclosure.

Reference is made to FIG. 1, FIG. 2, FIG. 6A and FIG. 6B. FIG. 6B is a schematic diagram illustrating a pixel circuit PIXa according to some embodiments of the present disclosure. In some embodiments, the luminance compensation method 200 is capable for a display panel 110 with pulse amplitude modulation techniques for light dimming function. In this case, each of the pixel circuits PIX included in the pixel array 118 can be implemented by the pixel circuit PIXa in FIG. 6B.

As shown in FIG. 6B, the pixel circuit PIXa includes a driving transistor Td, a light emitting element L1, a transistor T11 and a capacitor Cst. In structure, the driving transistor Td and the light emitting element L1 are electrically coupled between a system high voltage terminal VDD and a system low voltage terminal VSS. In some embodiments, the light emitting element L1 can be implemented by a micro-light emitting diode or the light emitting diode with other size. In a data setting period, a gate end of the transistor T11 receives a scan signal from a gate line GL to transmit a voltage on the data line DL to a gate end of the driving transistor Td, such that the driving transistor Td can control a pulse amplitude of a driving current Ida in an emission period according to voltage at the gate end of the driving transistor Td so as to compensate the luminance drop of the light emitting element L1 causing by the increased temperature.

For example, under the condition of the same input gray-level, if a temperature of a display panel 110 is 25° C., an input gray-level can be converted to a data voltage Vdata25 according to an original gamma curve G. If a temperature of the display panel is 45° C., the input gray-level can be converted to a data voltage Vdata42 according to a gamma correction curve G'. Therefore, under the condition of the same input gray-level, when the temperature is lower, the pixel circuit PIXa provides a driving current Ida25 with smaller amplitude, and when the temperature is higher, the pixel circuit PIXa provides a driving current Ida25 with higher amplitude. As a result, the pixel circuit PIXa compensates the luminance of the light emitting element L1 at different temperatures by controlling the pulse amplitude of the driving current Ida.

Figure 7:
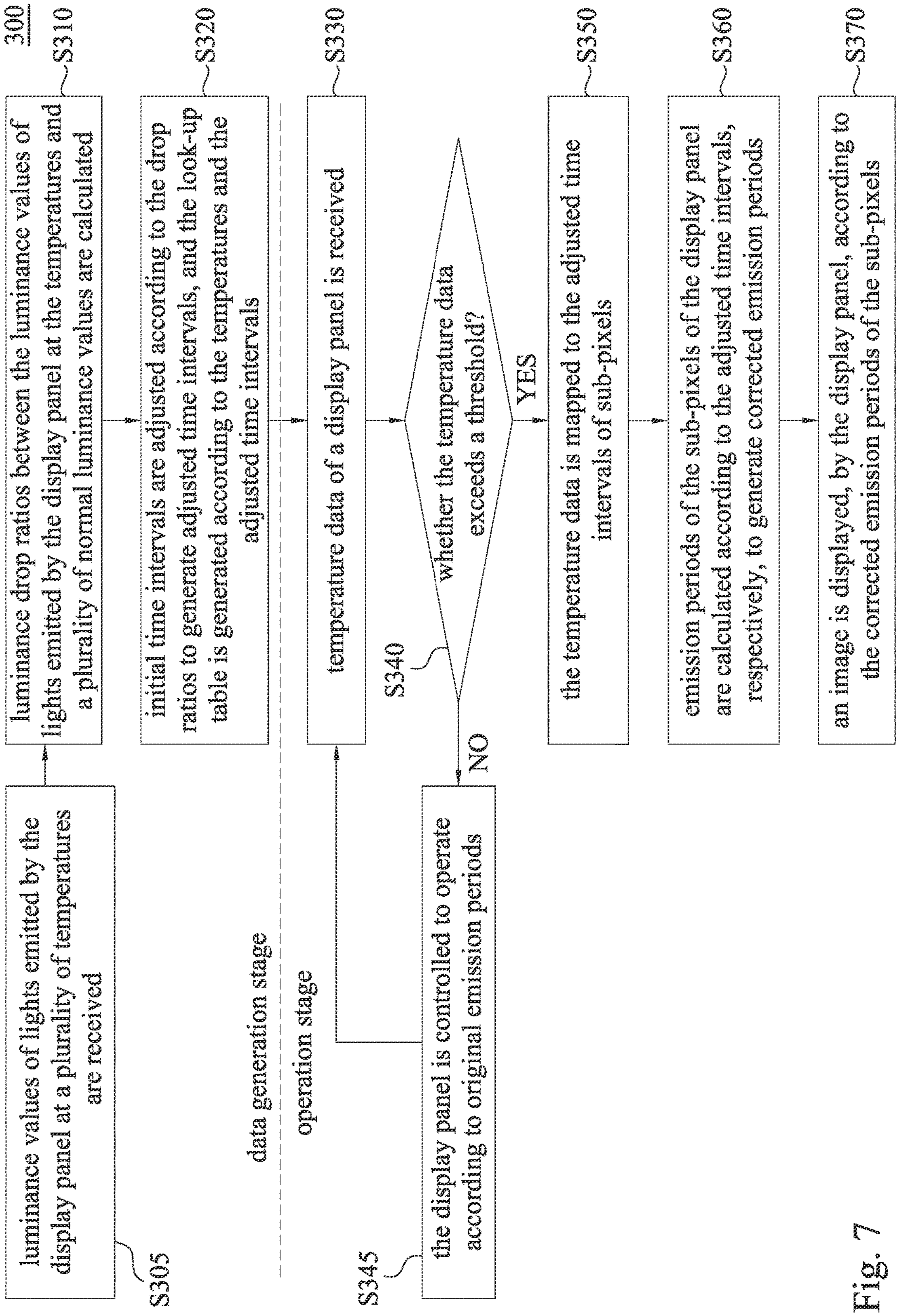
FIG. 7 is a flowchart illustrating a luminance compensation method according to some embodiments of the present disclosure.

Reference is made to FIG. 1, FIG. 2, and FIG. 7. FIG. 7 is a flowchart illustrating a luminance compensation method 300 according to some embodiments of the present disclosure. In some embodiments, the luminance compensation method 300 is capable for a display system 100 of a display panel 110 with pulse width modulation techniques for light dimming functions.

Figure 8A:
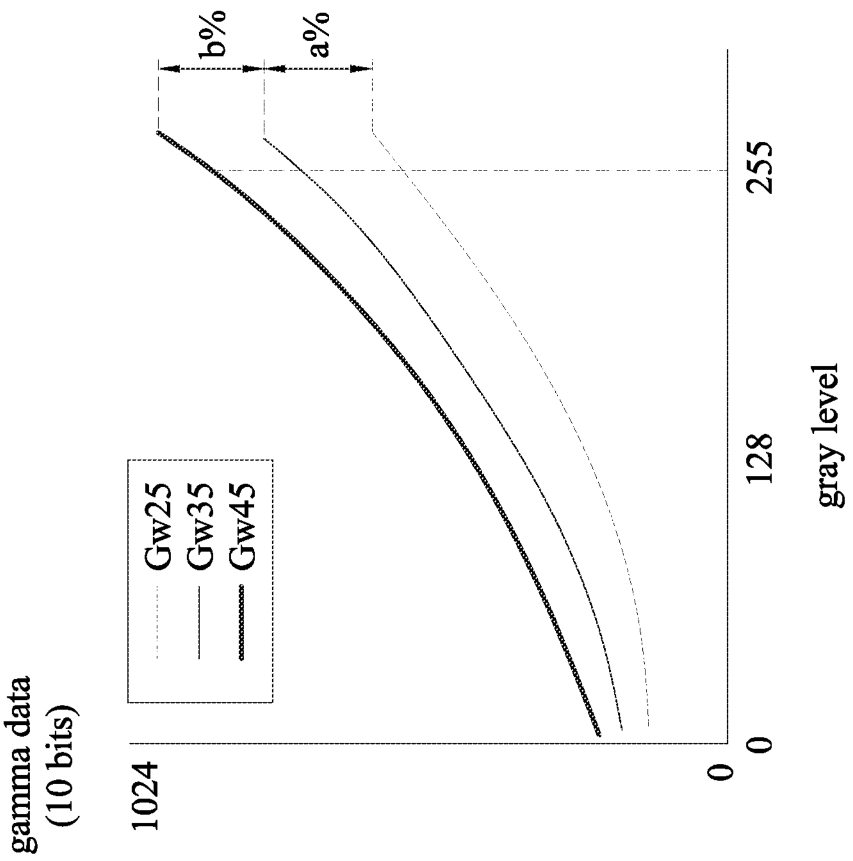
FIG. 8A is a schematic diagram illustrating adjusted gamma curves according to some embodiments of the present disclosure.
Figure 8B:
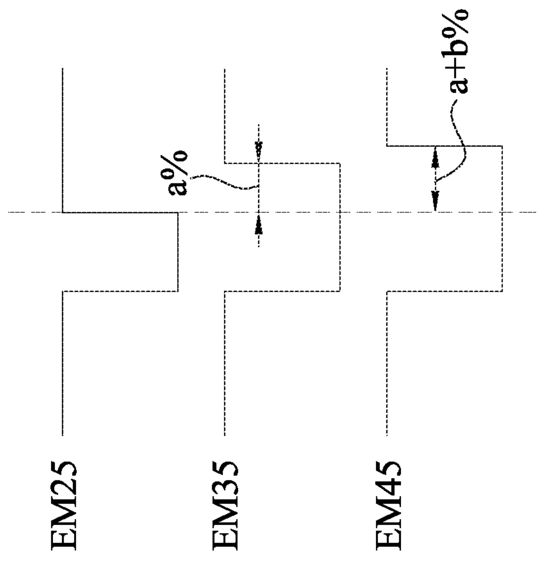
FIG. 8B is a schematic diagram illustrating parameters for calibrating the emission periods at different temperatures according to some embodiments of the present disclosure.

For better understanding how to calibrate the luminance for the display panel 110 with pulse width modulation techniques for light dimming functions at different temperatures. Reference is made to FIGS. 8A and 8B. FIG. 8A is a schematic diagram illustrating an original gamma curve Gw25 and adjusted gamma curves Gw35~Gw45 according to some embodiments of the present disclosure. FIG. 8B is a schematic diagram illustrating parameters for calibrating the emission periods EM25~EM45 at different temperatures according to some embodiments of the present disclosure. The said adjusted gamma curves Gw35~Gw45 are obtained by calibrating the display panel 110 at the different temperature to achieve a target luminance.

As shown in FIG. 8A, the adjusted gamma curve Gw35 of the display panel 110 at temperature of 35° C. is about a % brighter than the original gamma curve Gw25 of the display panel 110 at temperature of 25° C. at each gray-levels, and the adjusted gamma curve Gw45 of the display panel 110 at temperature of 45° C. is about (a+b) % brighter than the original gamma curve Gw25 of the display panel 110 at temperature of 25° C. at each gray-levels. In some embodiments, the gamma data is proportion to the data voltages which is utilized to control the pulse width of a driving current flowing through a light emitting element, it means that a pulse width of a driving current flowing through a light emitting element at 35° C. needs to be a % greater than a pulse width of a driving current flowing through the light emitting element at 25° C. so as to achieve the same luminance at the same gray-level. Similarity, a pulse width of a driving current flowing through a light emitting element at 45° C. needs to be (a+b) % greater than a pulse width of a driving current flowing through the light emitting element at 25° C. so as to achieve the same luminance.

In this case, when the temperature of the display panel 110 is increased, it require longer emission period to contain the wider pulse width of driving current at high gray-level in order to compensate the luminance drop caused by the increased temperature.

As shown in FIG. 8B, the emission period EM35 at a temperature of 35° C. is adjusted to be a % more than emission period EM25 at a temperature of 25° C. The emission period EM45 at a temperature of 45° C. is adjusted to be (a+b) % more than emission period EM25 at the temperature of 25° C.

Therefore, the luminance compensation method 300 is to compensate luminance of the display panel 110 with the pulse width modulation techniques for light dimming functions by adjusting and controlling the time length of the emission period, and maintaining a duty cycle of an adjusted emission period to be the same with a duty cycle in an emission period before calibration at the same input gray-level.

Reference is made to FIG. 1 and FIG. 7, the luminance compensation method 300 includes steps S305~S370. Wherein steps S305~S370 can be classified into steps S305~S320 which can be performed at a data generation stage and steps S330~S370 which can be performed at an operation stage. In some embodiments, steps S305~S320 can be performed before the product leaves the factory, and steps S330~S370 can be performed during the product being used. In some embodiments, steps S330~S360 of the luminance compensation method 300 can be performed by the processing circuit 122, and step S370 can be performed by the display panel 110.

The luminance compensation method 300 capable for the display panel 110 with pulse width modulation techniques for light dimming functions includes steps S305~S320 at a data generation stage.

In step S305, luminance values of lights emitted by the display panel 110 at multiple temperatures are received. For example, when a temperature of the display panel 110 is increased, an optical measuring apparatus (not shown in FIG. 1) of an optical detection system (not shown in FIG. 1) detects luminance values of display panel 110 which displays a preset picture (such as, a white display picture), and transmits the luminance values to the processing circuit 122. In some embodiments, the luminance values of the display panel 110 at different temperatures can be divided into luminance values for red lights, green lights and blue lights. For example, the luminance values for red lights, green lights and blue lights of the display panel 110 at multiple temperatures before calibration is expressed by Table 2 as shown in following.

TABLE 2

| | red lights (nits) | green lights (nits) | blue lights (nits) |
|---|---|---|---|
| 25° C. | 230 | 673 | 97 |
| 28° C. | 221.5 | 668.2 | 95.3 |
| 37° C. | 196.2 | 653.6 | 90.2 |
| 45° C. | 173.6 | 640.7 | 85.7 |
| 48° C. | 165.1 | 635.8 | 84.0 |
| 53° C. | 151.0 | 627.8 | 81.2 |
| 56° C. | 142.6 | 622.9 | 79.5 |
| 64° C. | 120 | 610 | 75 |

In step S310, luminance drop ratios between the luminance values of lights emitted by the display panel 110 at the temperatures and a plurality of normal luminance values are calculated. Specifically, an aforesaid luminance value is subtracted from a normal luminance value to calculate a difference and the difference is divided by the normal luminance value to obtain a luminance drop ratio.

For example, before calibration, a luminance value of red lights of the display panel 110 at 45° C. is 173.6 nits, and a luminance value of red lights of the display panel 110 at 25° C. is supposed to be an normal luminance value (such as, 230 nits), a luminance drop ratio is equal to ((230−176.3)/230)=24.5%. Similarity, a luminance drop ratio of the red lights of the display panel 110 at 64° C. is equal to ((230−120)/230)=47.8%, and so on. For the other example, a luminance value of green lights of the display panel 110 at 45° C. is 640.7 nits, and a luminance value of green lights of the display panel 110 at 25° C. is supposed to be an normal luminance value (such as, 673 nits), a luminance drop ratio is equal to ((673−640.7)/640.7)=4.8%, and so on. As a result, the processing circuit 122 obtains the luminance drop ratios for red lights, green lights and blue lights of the display panel 110 at multiple temperatures.

In step S320, initial time intervals are adjusted according to the drop ratios to generate adjusted time intervals, and the look-up table is generated according to the temperatures and the adjusted time intervals. Specifically, the adjusted time intervals can be expressed by the following formula.

$$e' = e/(1-R)$$

In the above formula, an adjusted time interval is expressed by e', an initial time interval is expressed by e, and a luminance drop ratio is expressed by R.

As a result, the adjusted time intervals for the red, green and blue sub-pixel at the temperatures can be obtained, and a look-up table can be generated according to the said adjusted time intervals. The look-up table can be expressed by Table 3 as shown in the following.

TABLE 3

| | adjusted time interval for red sub-pixel (μs) | adjusted time interval for green sub-pixel (μs) | adjusted time interval for blue sub-pixel (μs) |
|---|---|---|---|
| 25° C. | 20.0 | 35 | 18 |
| 28° C. | 20.8 | 35.3 | 18.3 |
| 37° C. | 23.5 | 36 | 19.4 |
| 45° C. | 26.5 | 36.8 | 20.4 |
| 48° C. | 27.9 | 37 | 20.8 |
| 53° C. | 30.5 | 37.5 | 21.5 |
| 56° C. | 32.3 | 37.8 | 22 |
| 64° C. | 38.3 | 38.66 | 23.3 |

In some embodiments, the aforesaid look-up table can be wrote into the memory 124 by one-time programming for the processing circuit 122 to access at the operation stage of the display panel 110.

The luminance compensation method 300 capable for the display panel 110 with pulse width modulation techniques for light dimming functions at the operation stage includes steps S330~S370.

In step S330, temperature data TempDATA of a display panel 110 is received. In some embodiments, the temperature sensor 105 detects a temperature at the display panel 110 and generates the temperature data TempDATA. In some embodiments, the processing circuit 122 receives the current temperature data TempDATA of the display panel 110 from the temperature sensor 105.

In step S340, whether the temperature data exceeds a threshold? In some embodiments, the processing circuit 122 determines whether the temperature data exceeds a threshold. In some embodiments, the aforesaid threshold can be implemented by 25° C., 30° C., 35° C. or other appropriate temperature, which is not intended to limit the present disclosure. If the temperature data TempDATA is lower than the threshold, step S345 is then performed, the display panel 110 is controlled to operate according to original emission periods. The original emission periods can be, such as, the emission periods for the red, green and blue sub-pixels at temperature of 25° C. If the temperature data is higher than the threshold, step S350 is performed.

In step S350, the temperature data TempDATA is mapped to the adjusted time intervals of sub-pixels. Specifically, the processing circuit 122 maps the temperature data TempDATA to adjusted time intervals for red, green and blue sub-pixels according to the aforesaid look-up table. For example, if the temperature data TempDATA is 45° C., adjusted time intervals for red, green and blue sub-pixels respectively are 26.5 μs, 36.8 μs and 20.4 μs. In some embodiments, the aforesaid adjusted time intervals generated according to the current temperature data TempDATA correspond to the calibration parameters CalParm in FIG. 1.

In step S360, emission periods of the sub-pixels of the display panel 110 are calculated according to the adjusted time intervals, respectively, to generate corrected emission periods. For example, is the emission period of the red, green and blue sub-pixels before calibration respectively are 20.0 μs, 35 μs and 18 μs, the aforesaid adjusted time intervals for red, green and blue sub-pixels are updated to the emission periods of the red, green and blue sub-pixels, so as to generate the corrected emission periods of the red, green and blue sub-pixels, such as, 26.5 μs, 36.8 μs and 20.4 μs.

In step S370, an image is displayed, by the display panel 110, according to the corrected emission periods of the sub-pixels. For example, the display panel 110 displays an image according to the corrected emission periods of the red, green and blue sub-pixels, such as, 26.5 μs, 36.8 μs and 20.4 μs.

In some embodiments, the display panel 110 adjusts an original gamma curve according to a ratio of the original emission periods of the red, green and blue sub-pixels to the corrected emission periods of the red, green and blue sub-pixels, to generate gamma correction curves of the red, green and blue sub-pixels. In some embodiments, the display panel 110 displays an image according to the said gamma correction curved and the corrected emission periods of the red, green and blue sub-pixels. In some embodiments, when a display panel 110 is at a temperature, an amplitude ratio of the gamma correction curve to an original gamma curve of a sub-pixel is equal to a ratio of a corrected emission period to an original emission period of the sub-pixel. In some embodiments, when a display panel 110 is at a temperature, amplitude ratios of gamma correction curves to original gamma curves of red, green and blue sub-pixels are respectively equal to ratios of corrected emission periods to original emission periods of the red, green and blue sub-pixels.

As a result, the luminance values of the red lights, green lights and blue lights of the calibrated display panel 110 can be shown in the Table 4.

TABLE 4

| | red lights (nits) | green lights (nits) | Blue lights (nits) |
|---|---|---|---|
| 25° C. | 230.0 | 673.0 | 97.0 |
| 28° C. | 230.4 | 673.9 | 96.9 |
| 37° C. | 230.5 | 672.3 | 97.2 |
| 45° C. | 230.0 | 673.6 | 97.1 |
| 48° C. | 230.4 | 672.2 | 97.1 |
| 53° C. | 230.3 | 672.6 | 97.0 |
| 56° C. | 230.2 | 672.8 | 97.2 |
| 64° C. | 229.8 | 672.7 | 97.1 |

A shown in Table 4, each color of lights emitted by the display panel 110 can be compensated to the normal luminance (such as, the normal luminance values of the red lights, green lights and the blue lights of the display panel 110 are respectively 230.0 nits, 673.0 nits and 97.0 nits) by performing steps S330~S370.

Figure 9:
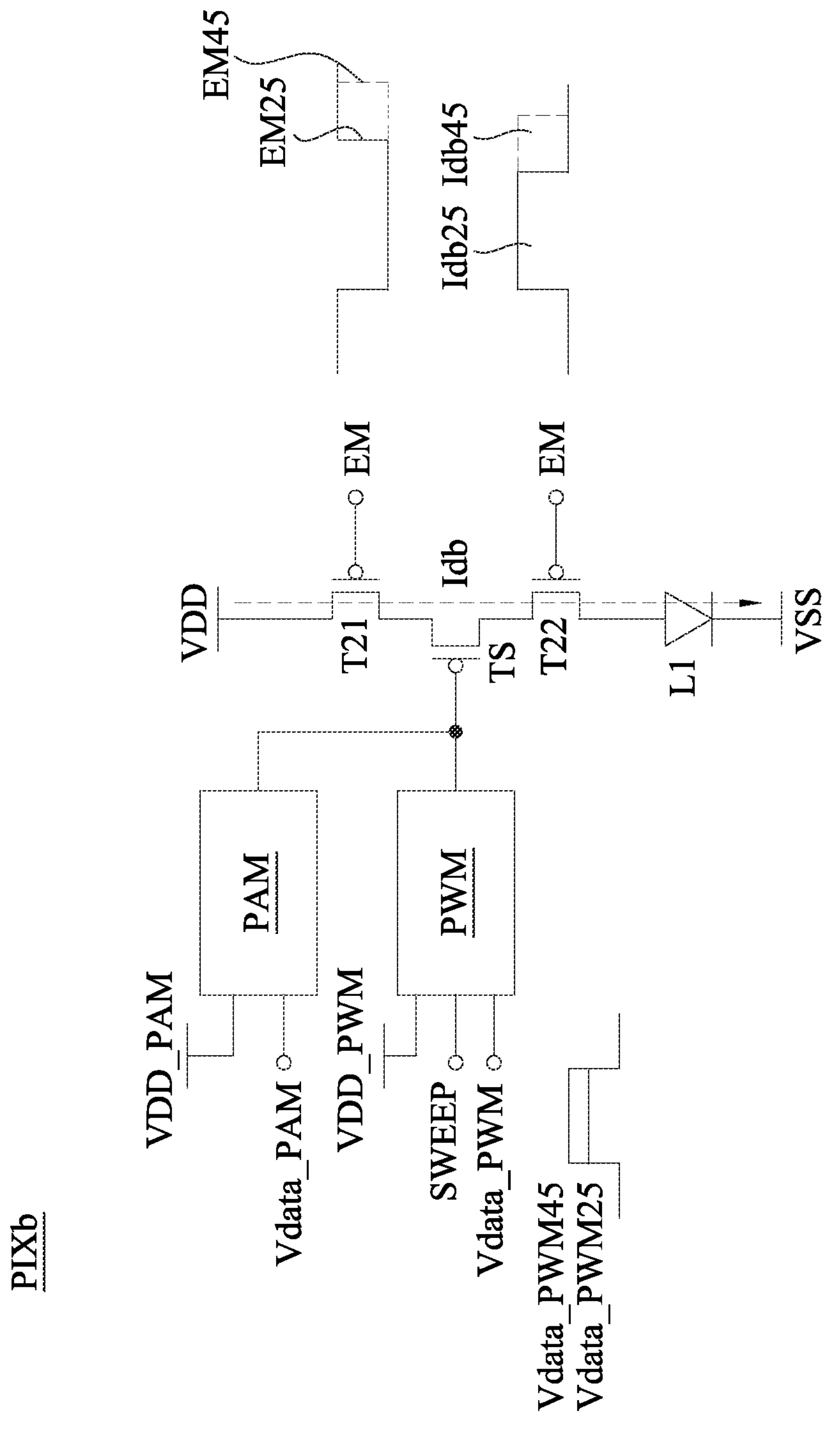
FIG. 9 is a schematic diagram illustrating a pixel circuit according to some embodiments of the present disclosure.

Reference is made to FIG. 1, FIG. 2, FIG. 7 and FIG. 9. FIG. 9 is a schematic diagram illustrating a pixel circuit PIXb according to some embodiments of the present disclosure. In some embodiments, each of the pixel circuits PIX included in the pixel array 118 of FIG. 2 can be implemented by the pixel circuit PIXb in FIG. 9. In some embodiments, the pixel circuit PIXb includes a pulse amplitude modulation circuit PAM, a pulse width modulation circuit PWM, transistor T21 and T22, light emitting elements L1 and a switching transistor TS. The pulse amplitude modulation circuit PAM and the pulse width modulation circuit PWM electrically coupled to system high voltage terminals VDD_PAM and VDD_PWM, respectively. The pulse amplitude modulation circuit PAM is configured to control pulse amplitude of the driving current Idb according to a data voltage Vdata_PAM.

The pulse width modulation circuit PWM is configured to control pulse width of the driving current Idb according to a data voltage Vdata_PWM. In some embodiments, in a data setting period, the data voltage Vdata_PWM is transmitted to an operation node of the pulse width modulation circuit PWM. In an emission period, a sweep signal SWEEP gradually pulls down a voltage at the operation node of the pulse width modulation circuit PWM to control the timing for transmitting the voltage of the system high voltage terminal VDD_PWM to a gate end of the switching transistor TS. When the voltage of the system high voltage terminal VDD_PWM is transmitted to the gate end of the switching transistor TS, the switching transistor TS turns off, so as to control/adjust pulse width of the driving current Idb according to the data voltage Vdata_PWM.

In some embodiments, the transistors T21 and T22 are configured to receive emission control signals EM. In some embodiments, a time length of the emission control signal EM at an enable voltage can be considered as a time length of an emission period.

For example, under the condition of the same input gray-level, if the display panel 110 is at 25° C., the gray-level is converted to a data voltage Vdata_PWM25 according to an original gamma curve, and the display panel 110 is operated according to the data voltage Vdata_PWM25 and an original emission period EM25; If the display panel 110 is at 45° C., the said gray-level is converted to a data voltage Vdata_PWM45 according to a gamma correction curve and a corrected emission period EM45 is generated according to the temperature of 45° C., and the display panel 110 is operate according to the data voltage Vdata_PWM45 and the corrected emission period EM45. Therefore, under the condition of the same input gray-level, the pixel circuit PIXb provides a driving current Idb25 with narrower pulse width at a lower temperature, and the pixel circuit PIXb provides a driving current Idb45 with wider pulse width at a higher temperature. As a result, the pixel circuit PIXb can compensate luminance of the light emitting element L1 at different temperatures by controlling pulse width of the driving current Idb.

Figure 10:
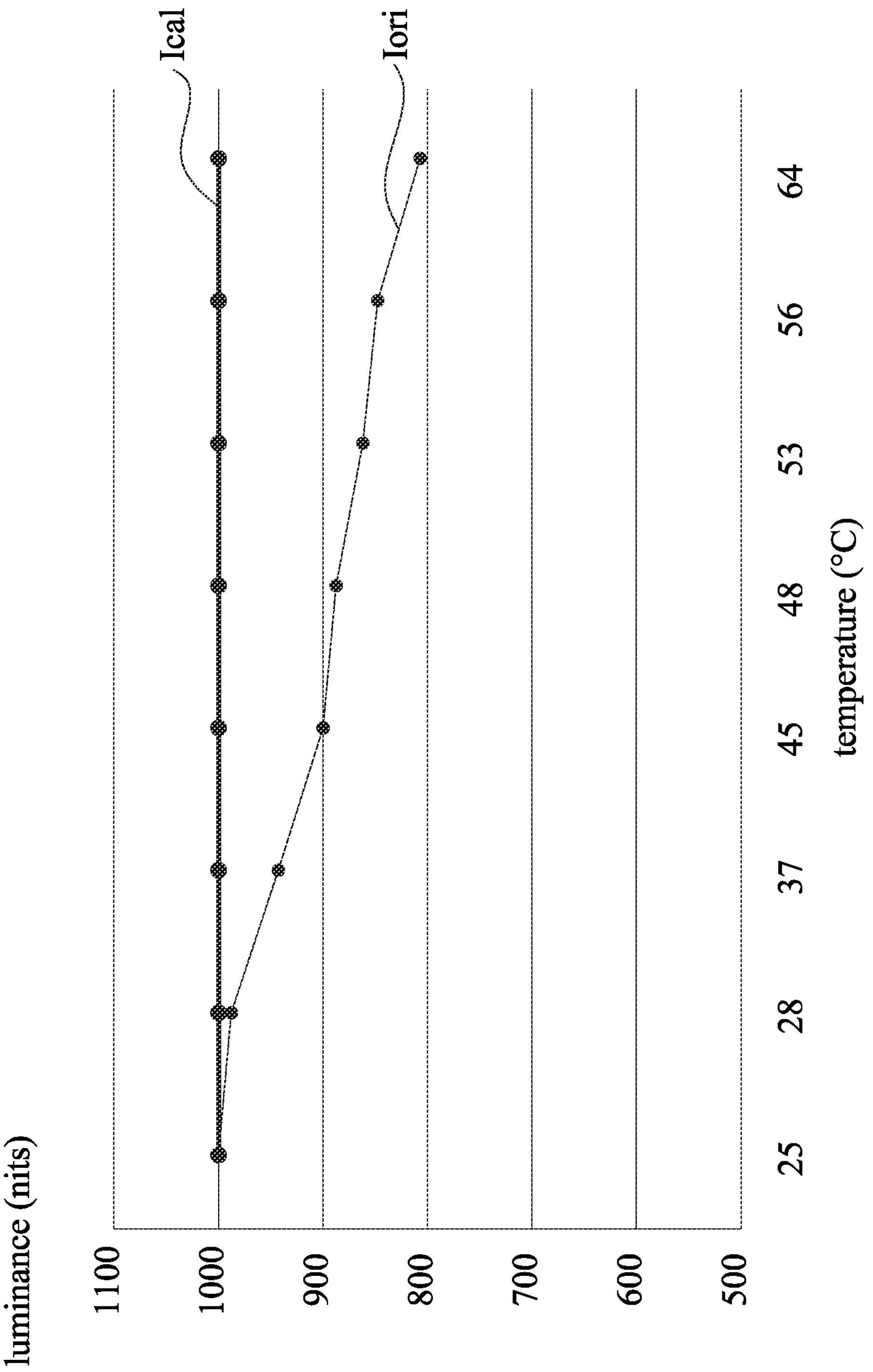
FIG. 10 is a schematic diagram illustrating brightness of a display panel variated with temperature before and after calibration according to some embodiments of the present disclosure.

Reference is made to FIG. 10. FIG. 10 is a schematic diagram illustrating brightness of a display panel 110 variated with temperature before and after calibration according to some embodiments of the present disclosure. As shown in FIG. 10, before the calibration, the luminance lori of the display panel 110 is decreased rapidly when the temperature is increased. After the calibration by performing steps S330~S370, the luminance Ical of the display panel 110 is not affected by the variation of the temperature, such that stability of the display panel 110 performs better.

Figure 11B:
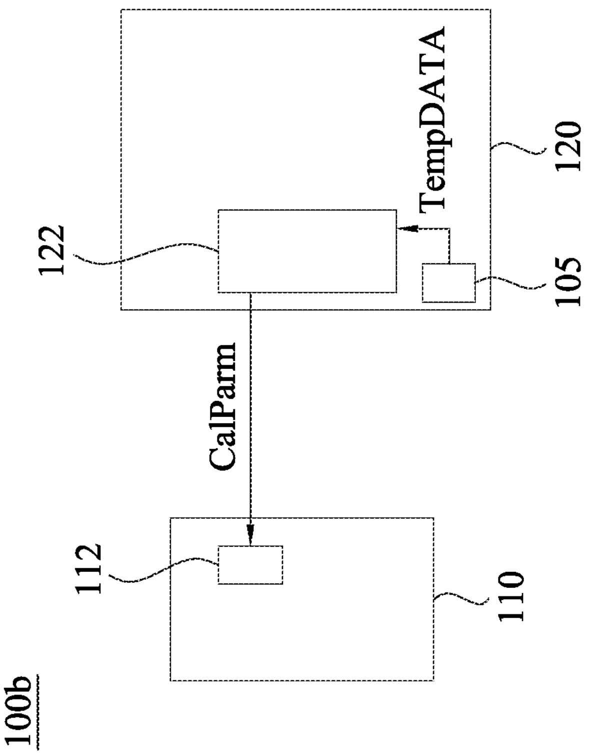
FIGS. 11A and 11B are schematic diagrams illustrating display systems according to some embodiments of the present disclosure.
Figure 11A:
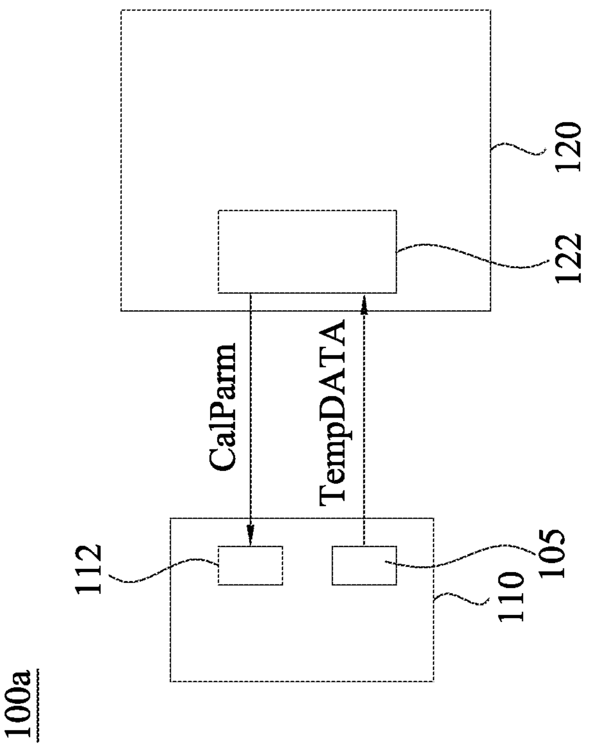

Reference is made to FIGS. 11A and 11B. FIGS. 11A and 11B are schematic diagrams illustrating display systems 100*a* and 100*b* according to some embodiments of the present disclosure. As shown in FIG. 11A, the temperature sensor 105 is disposed in the display panel 110, and the temperature sensor 105 transmits the temperature data TempDATA to the processing circuit 122 in a computing system 120. As shown in FIG. 11B, the temperature sensor 105 is disposed in a computing system 120 and is configured to detect a temperature of the display panel 110 to generate temperature data TempDATA.

Figure 12A:
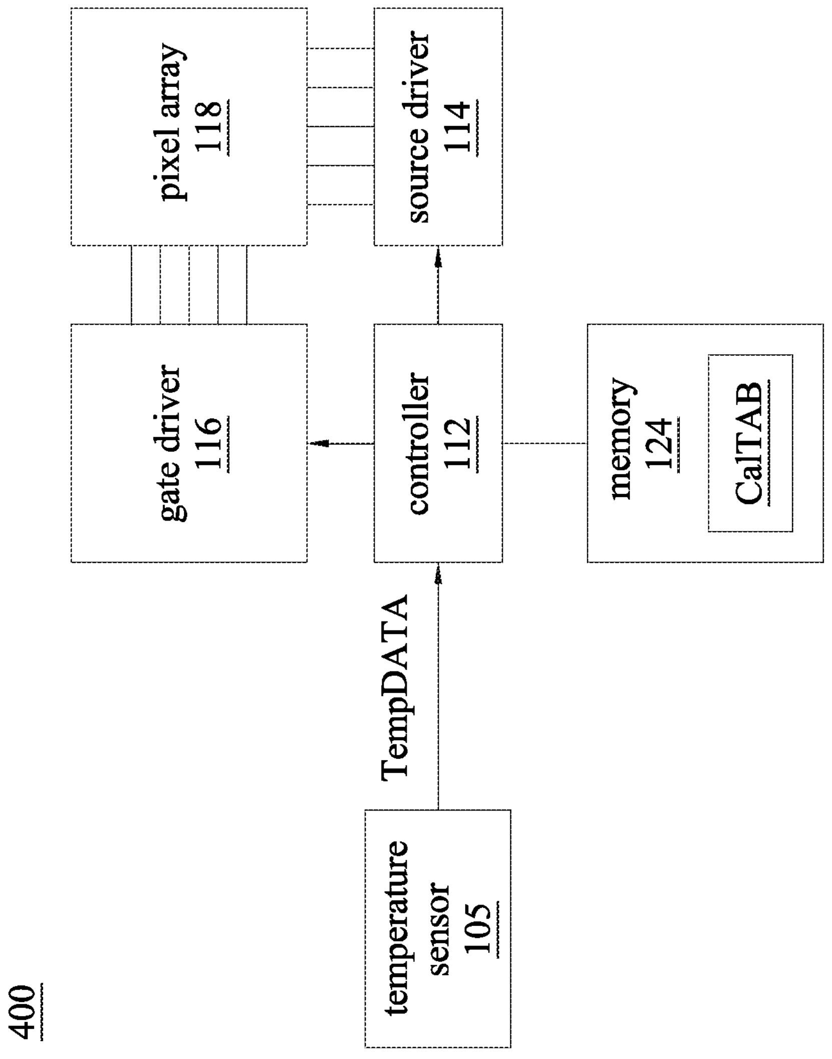
FIG. 12A is a schematic diagram illustrating functions of a display system according to some embodiments of the present disclosure.

Reference is made to FIG. 2A, FIGS. 4A~4C, FIG. 7 and FIG. 12A. FIG. 12A is a schematic diagram illustrating functions of a display system 400 according to some embodiments of the present disclosure. Compare to the display system 100 in embodiments of FIG. 1, the display system 400 in FIG. 12A performs luminance compensation on the display panel 110, by the controller 112, according to the temperature data TempDATA and the calibration table CalTAB. The controller 112 is electrically coupled to the temperature sensor 105 to receive temperature data TempDATA. The controller 112 is electrically coupled to the memory 124 to obtain the calibration table CalTAB.

In embodiments of FIG. 12A, steps S220~S270 of the luminance compensation method 200 in FIG. 4A~4C or steps S330~S370 of the luminance compensation method 300 in FIG. 7 are performed by the controller 112. Therefore, it is not intended to limit the present disclosure for the circuit for performing the luminance compensation methods 200 or 300.

Figure 12B:
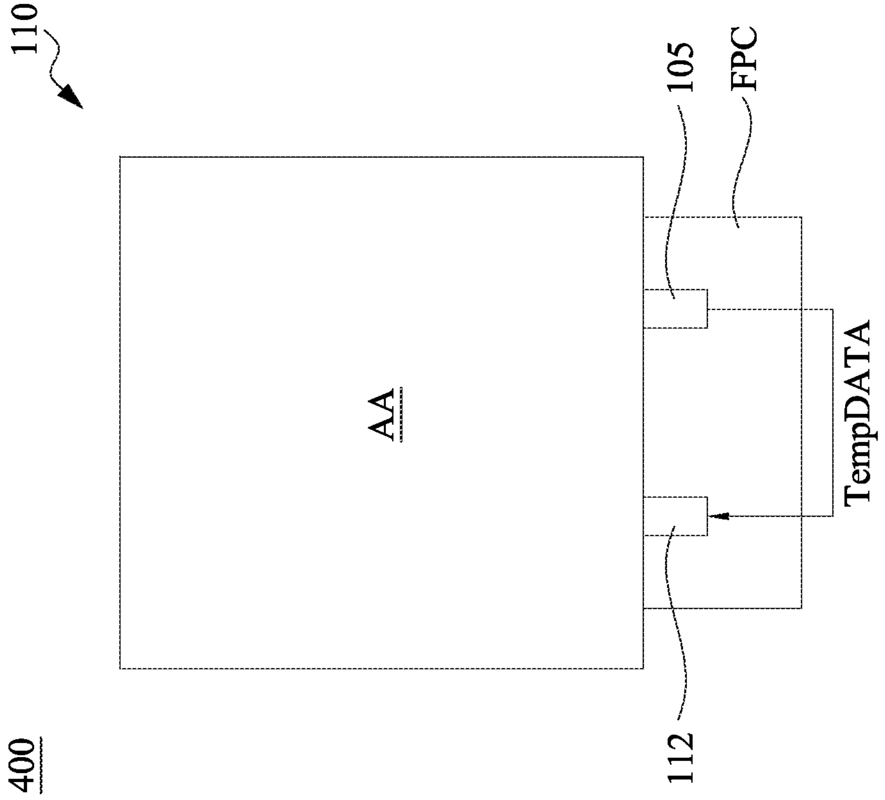
FIG. 12B is a schematic diagram illustrating architecture of a display system according to some embodiments of the present disclosure.

Reference is made to FIG. 12A and FIG. 12B. FIG. 12B is a schematic diagram illustrating architecture of a display system 400 according to some embodiments of the present disclosure. In the embodiments of FIG. 12A and FIG. 12B, the controller 112 and the temperature sensor 105 can be disposed in the flexible printed circuit FPC, to control the pixel circuit in an active area AA through traces of the flexible printed circuit FPC.

Figure 13:
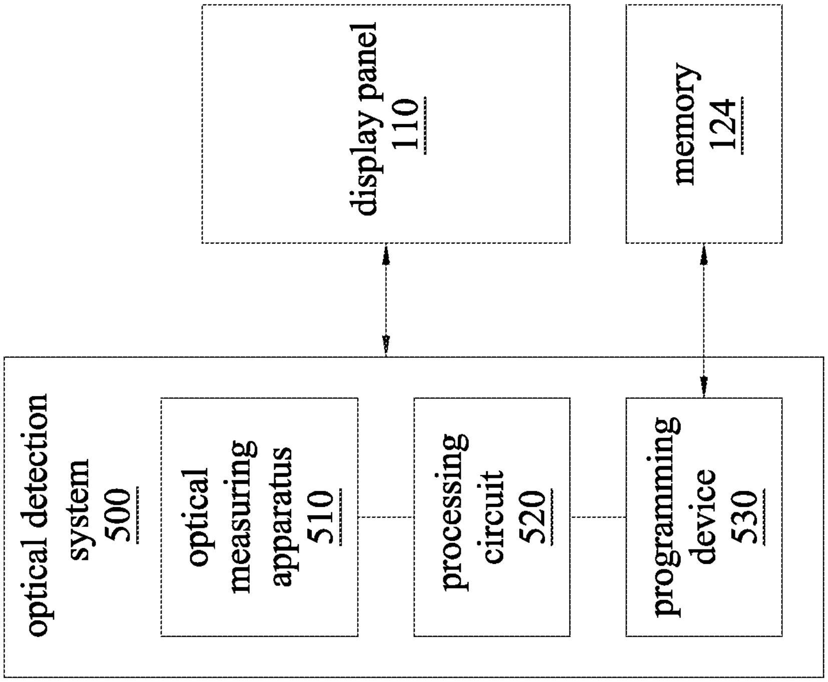
FIG. 13 is a schematic diagram illustrating an optical measuring system, a display panel and a memory according to some embodiments of the present disclosure.

Reference is made to FIG. 1 and FIG. 13. FIG. 13 is a schematic diagram illustrating an optical detection system 500, a display panel 110 and a memory 124 according to some embodiments of the present disclosure. In some embodiments, steps S211~S215 of the luminance compensation method 200 and steps S305~S320 of the luminance compensation method 300 can be performed by the optical detection system 500. The optical detection system 500 includes an optical measuring apparatus 510 configured to measure luminance values of the display panel 110. The processing circuit 520 is configured to perform steps S211~S215 or steps S305~S320. The programming device 530 is configured to perform one time programming on the memory 124 to write the calibration table CalTAB in the memory 124. In some embodiments, the calibration table CalTAB corresponding to the aforesaid gamma correction table and/or look-up table.

In the other embodiments, steps S211~S215 of the luminance compensation method 200 and steps S305~S320 of the luminance compensation method 300 can be performed by the processing circuit 122 in FIG. 1, which is not intended to limit the present disclosure.

In some embodiments, the said processing circuit in the present disclosure can be a central processing unit, a microprocessor, a graphics processor, a field-programmable gate array integrated circuit (FPGA), an application specific integrated circuit (ASIC), or other devices suitable for extracting or executes instructions and access data stored in the memory.

In some embodiments, the said processing circuit in the present disclosure can be implemented by electrical, magnetic, optical memory devices or other storage devices which can store instructions or data. In some embodiments, the memory can be implemented by volatile memory or non-volatile the memory. In some embodiments, the memory can be random access memory (RAM), dynamic random access memory (DRAM), magnetoresistive random access memory (MRAM), phase-change random access memory (PCRAM) or other storage devices.

In summary, if a display panel 110 uses pulse amplitude modulation techniques to perform light dimming functions, the luminance compensation method 200 provided by the present disclosure can compensate the different luminance drop ratios of the display panel 110 at the current temperature. Furthermore, steps S240~S270 of the luminance compensation method 200 can be perform on gamma data of each of the red, green and blue sub-pixels, it can compensate the different luminance drop ratios of the red, green and blue sub-pixels at the same temperature. If a display panel 110 uses pulse width modulation techniques to perform light dimming functions, the luminance compensation method 300 provided by the present disclosure can compensate the different luminance drop ratios of the red, green and blue sub-pixels of the display panel 110 at the current temperature. And, the luminance compensation methods 200 and 300 can effectively compensate the luminance drop of the display panel 110 when the temperature of the display panel 110 is increased.

It will be apparent to those skilled in the art that various modifications and variations can be made to the structure of the present invention without departing from the scope or spirit of the invention. In view of the foregoing, it is intended that the present invention cover modifications and variations of this invention provided they fall within the scope of the following claims.

What is claimed is:

1. A luminance compensation method, comprising:

during a data generation stage;

when a temperature of a display panel is increased and sequentially reaches a plurality of preset temperatures, adjusting an initial gamma curve according to a plurality of drop ratios of the display panel at a plurality of gray levels, to generate a plurality of adjusted gamma curves at the preset temperatures; and selecting a plurality of reference points from the adjusted gamma curves at the preset temperatures;

performing axis transformation on the reference points by replacing an axis of pixel coordinate with an axis of temperature to generate a plurality of transformed reference points; and fitting the transformed reference points to generate a plurality of functions of gamma versus temperature, and generating a gamma correction table according to the functions of gamma versus temperature;

and during an operation stage;

receiving temperature data of the display panel;

obtaining the gamma correction table;

substituting the temperature data into the functions of gamma versus temperature in the gamma correction table to generate a plurality of gamma adjustment points;

generating a gamma correction curve according to the gamma adjustment points; and displaying an image, by the display panel, according to the gamma correction curve.

2. The luminance compensation method of claim 1, further comprising:

determining whether the temperature data is higher than a threshold;

if the temperature data is lower than the threshold, controlling the display panel to operate according to an original gamma curve; and if the temperature data is higher than the threshold, controlling the display panel to operate according to the gamma correction curve.

3. The luminance compensation method of claim 1, further comprising:

displaying the image, by the display panel with pulse amplitude modulation techniques for light dimming function, according to the gamma correction curve.

4. A luminance compensation method, comprising:

during a data generation stage;

receiving a plurality of luminance values of a display panel at a plurality of temperatures;

calculating a plurality of luminance drop ratios between the luminance values of the display panel at the temperatures and a plurality of normal luminance values; and adjusting a plurality of initial time intervals according to the luminance drop ratios to generate a plurality of adjusted time intervals, and generating a look-up table according to the temperatures and the adjusted time intervals; and during an operation stage;

receiving temperature data of the display panel;

utilizing the look-up table to map the temperature data to the adjusted time intervals of a plurality of sub-pixels;

calibrating a plurality of emission periods of the sub-pixels of the display panel according to the adjusted time intervals, respectively, to generate a plurality of corrected emission periods; and displaying an image, by the display panel, according to the corrected emission periods of the sub-pixels.

5. The luminance compensation method of claim 4, wherein the adjusted time intervals of the sub-pixels are respectively longer than the initial time intervals of the sub-pixels.

6. The luminance compensation method of claim 4, wherein in the sub-pixels comprises a red sub-pixel, a green sub-pixel and a blue sub-pixel.

7. The luminance compensation method of claim 4, further comprising:

adjusting original gamma curves of the sub-pixels according to a plurality of ratios of a plurality of original emission periods of the sub-pixels to the corrected emission periods of the sub-pixels, to generate a plurality of gamma correction curves of the sub-pixels; and displaying the image, by the display panel, according to the corrected emission periods and the gamma correction curves of the sub-pixels.

8. The luminance compensation method of claim 7, wherein amplitude ratios of the gamma correction curves to the original gamma curves are respectively equal to ratios of the corrected emission periods to the original emission periods.

9. The luminance compensation method of claim 4, further comprising:

determining whether the temperature data is higher than a threshold;

if the temperature data is lower than the threshold, controlling the display panel to operate according to an original emission periods; and if the temperature data is higher than the threshold, controlling the display panel to operate according to the corrected emission periods.

10. The luminance compensation method of claim 4, further comprising:

displaying the image, by the display panel with pulse width modulation techniques for light dimming function, according to the corrected emission periods.

* * * * *